United States Patent
Ducher (10) Patent No.: US 11,745,563 B2
(45) Date of Patent: Sep. 5, 2023

(54) ENGINELESS ELECTRICAL COMMUNICATION INTERFACE

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 207 days.

(21) Appl. No.: 17/064,962

(22) Filed: Oct. 7, 2020

(65) Prior Publication Data

US 2021/0101447 A1 Apr. 8, 2021

(30) Foreign Application Priority Data

Oct. 8, 2019 (EP) ..................................... 19202081

(51) Int. Cl.
*B60H 1/00* (2006.01)
*B60P 3/20* (2006.01)

(52) U.S. Cl.
CPC ....... *B60H 1/00978* (2013.01); *B60H 1/0073* (2019.05); *B60H 1/00378* (2013.01); *B60H 1/00807* (2013.01); *B60P 3/20* (2013.01)

(58) Field of Classification Search
CPC .............. B60H 1/0073; B60H 1/00378; B60H 1/00807; B60H 1/00978; B60H 1/3232; B60H 1/00014
See application file for complete search history.

(56) References Cited

U.S. PATENT DOCUMENTS

| | | | | |
|---|---|---|---|---|
| 5,186,015 A | 2/1993 | Roehrich | | |
| 5,456,088 A * | 10/1995 | Hanson | ............... | G05D 23/1912 62/157 |
| 6,662,580 B2 * | 12/2003 | Suitou | .................. | B60H 1/3222 417/42 |
| 7,739,013 B2 * | 6/2010 | Ishio | ..................... | B60W 50/00 701/87 |

(Continued)

FOREIGN PATENT DOCUMENTS

| | | | | |
|---|---|---|---|---|
| JP | 2005083640 A | * | 3/2005 | ........... B60H 1/3226 |
| JP | 2012096645 A | | 5/2012 | |

(Continued)

OTHER PUBLICATIONS

European Search Report for Application No. 19202081.6; dated Apr. 17, 2020; 6 Pages.

*Primary Examiner* — Nelson J Nieves
(74) *Attorney, Agent, or Firm* — CANTOR COLBURN LLP (57) ABSTRACT

A control system (300) for a transport engineless refrigeration unit (301), the control system including: a controller (302) for communication between a vehicle (307) and a plurality of vehicle devices, the controller comprising: a vehicle data connection (306) for transmitting data to and from a vehicle; a vehicle engine on/off connection (308) for triggering start-up of the vehicle engine; a plurality of device data connections (314), each device data connection transmits data to and from at least one device external to the controller; and a device power connection (313), the device power connection supplies power from the controller to at least one device external to the controller.

13 Claims, 4 Drawing Sheets

(56) References Cited

U.S. PATENT DOCUMENTS

| | | | | |
|---|---|---|---|---|
| 7,900,462 | B2* | 3/2011 | Hegar | B60H 1/00764 |
| | | | | 62/133 |
| 9,464,827 | B2* | 10/2016 | Olaleye | B60H 1/00014 |
| 9,915,462 | B2* | 3/2018 | Muralidhar | B60H 1/3211 |
| 10,368,468 | B1* | 7/2019 | Shelnutt | H05K 7/20827 |
| 2007/0296379 | A1* | 12/2007 | Gendron | H02P 9/08 |
| | | | | 322/37 |
| 2010/0250039 | A1* | 9/2010 | Bryan | B60K 6/445 |
| | | | | 903/930 |
| 2011/0162395 | A1* | 7/2011 | Chakiachvili | B60H 1/3226 |
| | | | | 62/236 |
| 2013/0255910 | A1* | 10/2013 | Neddermeyer, III | H02H 9/08 |
| | | | | 165/41 |
| 2014/0283533 | A1* | 9/2014 | Kurtzman | B60R 16/03 |
| | | | | 307/130 |
| 2015/0274056 | A1* | 10/2015 | Olaleye | B60P 3/20 |
| | | | | 62/115 |
| 2017/0057322 | A1* | 3/2017 | Kava | B60H 1/00985 |
| 2019/0092127 | A1* | 3/2019 | Nguyen | B60H 1/00978 |
| 2019/0111949 | A1* | 4/2019 | Ochiai | B60H 1/00 |
| 2019/0299749 | A1* | 10/2019 | Lattin | F25B 27/00 |
| 2020/0207326 | A1* | 7/2020 | Wenger | B60H 1/00771 |
| 2021/0031593 | A1* | 2/2021 | Kennedy | B60H 1/0045 |
| 2021/0268864 | A1* | 9/2021 | Saroka | B60L 58/27 |
| 2022/0080803 | A1* | 3/2022 | Lavrich | B60H 1/00428 |
| 2022/0080806 | A1* | 3/2022 | Lavrich | G07C 5/0816 |
| 2022/0088997 | A1* | 3/2022 | Briscoe | G06Q 10/06 |
| 2022/0090924 | A1* | 3/2022 | Schumacher | G07C 5/0825 |

FOREIGN PATENT DOCUMENTS

| | | | |
|---|---|---|---|
| WO | 2012138500 | A1 | 10/2012 |
| WO | 2019215468 | A1 | 11/2019 |

* cited by examiner

ENGINELESS ELECTRICAL COMMUNICATION INTERFACE

FOREIGN PRIORITY

This application claims priority to European Patent Application No. 19202081.6, filed Oct. 8, 2019, and all the benefits accruing therefrom under 35 U.S.C. § 119, the contents of which in its entirety are herein incorporated by reference.

TECHNICAL FIELD OF INVENTION

The present invention relates to transport refrigeration units and, more particularly, to a control system for a transport engineless refrigeration unit (TERU) and a method of monitoring and controlling the temperature of a TERU.

BACKGROUND OF THE INVENTION

Traditionally, a transport refrigeration unit, such as those utilized to transport cargo via sea, rail, or road, is a cargo truck, tractor trailer or cargo container, generally defining a (refrigerated) cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapour compression cycles. A dedicated power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

Recent developments include transport engineless refrigeration units (TERUs). These TERUs do not require dedicated power units such as an engine for powering the refrigeration system; instead TERUs utilise a power take off coupling to utilise energy from a prime mover such as the conventional engine of the transport vehicle to provide power. Thus, they are "engineless" in the sense that the transport refrigeration unit does not have a dedicated engine, but instead takes power from an external prime mover.

In one known system the power take off unit (PTO) of a truck is used to power a hydraulic pump that in turn powers a generator for a refrigeration unit. This is often referred to as "engineless" power. In this way, dedicated engines are not required to refrigerate cargo in vehicles, as all of the necessary power for refrigeration is provided by the combustion engine of the vehicle. Such systems can also be employed to power other devices in the vehicle; for example, various sensors (e.g. a temperature sensor of the TERU), alarm systems or telematics features. In such systems, the engine of the truck must be running to power to provide power to the power take off unit and the refrigeration system (and any other relevant vehicle devices).

Controllers for controlling and powering TERUs are typically integrated within the PTO. One example of such a TERU system is the ECO-DRIVE system developed by Carrier Corporation. It features a PTO power module, which is fitted to the side of the truck's chassis and transmits power from the engine of the truck in manner described above. As the controller is integrated within the PTO, the PTO must receive power from the engine of the truck before the TERU can be powered and any control signals can be sent or received.

With current environmental trends, improvements in transport refrigeration units are desirable particularly toward aspects of environmental impact. With environmentally friendly refrigeration units, improvements in reliability, cost, and weight reduction are also desirable.

SUMMARY OF THE INVENTION

In one aspect, the present invention provides a control system for a transport engineless refrigeration unit, the control system comprising: a controller for communication between a vehicle and a plurality of vehicle devices, the controller comprising: a vehicle data connection for transmitting data to and from a vehicle; a vehicle engine on/off connection for triggering start-up of the vehicle engine; a plurality of device data connections, wherein each device data connection transmits data to and from at least one device external to the controller; and a device power connection, wherein the device power connection supplies power from the controller to at least one device external to the controller.

By having a control system with data and power connections direct to a vehicle device at the control system level (i.e. the hardware of the device data connection and device power connection), the control system can power and control the device without having to power intermediate components, such as the PTO described above in relation to the ECO-DRIVE system and the system can avoid the need to relay data back to the controller through external routes, such as transmitting it elsewhere. This avoids the need for unnecessary energy consumption and enables a faster utilisation of vehicle devices as the vehicle engine does not have to start up, run and power a PTO etc.

As discussed above, transport engineless refrigeration units (TERUs) may refer to transport refrigeration units, such as those utilized to transport cargo via sea, rail, or road, is a cargo truck, tractor trailer or cargo container, generally defining a cargo compartment, and modified to include a refrigeration system located at one end of the truck, trailer, or cargo container that do not require dedicated power units such as an engine for powering the refrigeration system. Thus, the TERU does not include a dedicated engine for powering components of the refrigeration unit, such as the compressor thereof. TERUs may utilise a power take off coupling to utilise energy from a prime mover such as the conventional engine of the transport vehicle to provide such power to the refrigeration system.

The vehicle engine on/off connection is for triggering start-up of the vehicle engine and it may be arranged to provide a start-up request to the vehicle engine, whereafter safety logic at the vehicle may determine if the engine should be started, as discussed further below. The vehicle engine on/off connection may be an on/off connection that provides a start-up request to the vehicle engine via a high/low state for a voltage on a suitable line. Typically this can be a 24V line.

Advantageously, the controller is absent any safety logic relating to start-up of the vehicle engine. Thus, the controller may be incapable of determining if it is safe to start up the vehicle engine. Instead, it is left to the vehicle/the engine to apply safety logic and decide if the engine can be started after receiving a request to start the engine via the vehicle engine on/off connection. This is a difference compared to some prior art systems where the control system for the TERU takes up some responsibility for determining if it is safe to start the vehicle engine, because until the engine is started it is not possible for the control system to perform all its functions. Thus, in the prior art the control system of the TERU may need to periodically insist on a start-up for the vehicle engine to power the TERU and to check the status of the TERU, such as to check that temperature conditions are adequate to avoid spoilage of goods without added refrigeration. In contrast, with the proposed control system since there are both power and data connections it becomes possible for the control system to power the TERU in order to obtain temperature sensor data, thereby allowing the required status check without a compulsory start-up of the vehicle engine. This means that the vehicle engine on/off connection at the control system can instead request a vehicle start-up only on basis that the vehicle itself deems it to be safe to do so, with the safety logic residing on the vehicle (optionally solely on the vehicle). The control system may be arranged such that the vehicle engine is only requested to start-up if vehicle engine power is needed, i.e. for refrigeration or for recharging batteries.

The at least one device may include a TERU with both a power and a data connection to the controller. The control system may include the TERU. In this way, the TERU can be controlled and at least partially powered by the control system without a need to power intermediate or additional components such as a PTO unit with the engine of the vehicle.

The TERU may comprise a temperature sensor, the temperature sensor may be powered and controlled by the controller via the connections described above, and so a temperature of the TERU (for example a temperature of a cargo compartment) can be monitored without activating any intermediate components, such as a PTO and/or vehicle engine. In this way, a power source to the refrigeration system of the TERU, such as a PTO need only be activated when the temperature of the TERU is outside of a predetermined temperature range. In this way the TERU may be configured such that it can operate in a sleep mode, reducing power consumption.

By sleep mode it is meant that the temperature of the TERU (i.e. the temperature of a refrigerated compartment of the TERU) can be monitored without substantially powering the TERU. Any reference to monitoring/controlling the temperature of the TERU herein is in relation to a temperature controlled (e.g. refrigerated) compartment of the TERU.

The device power connection may supply DC power (e.g. 24V DC) to the device, such as for a device power connection supplying power to a TERU in order to power a temperature sensor thereof.

The at least one device may include a power module having at least one data connection to the controller. The control system may include the power module. Optionally there may also be a power connection between the power module and the controller. This power module may be arranged for interaction with a power take off unit (PTO) of the vehicle, wherein the power take off unit is configured to supply power to a refrigeration system of the transport engineless refrigeration unit via the power module. In this way the controller can control activation of power module (and hence of the PTO unit) and monitor its status or condition.

The power module may be configured to supply the TERU with 400V, 3 phase 50 Hz power. An example of a suitable power module is the Eco-Drive™ as marketed by Carrier Corporation.

References to a device may include any of the optional devices described herein. For example, but not limited to: any TERU; any power module; any PTO; any HMI; any telematics output/input; any battery; any inverter; —any generative axle (i.e. a generator mounted on a vehicle axle); any solar panel; any fuel tank gauge; any additional temperature sensors; and/or any fuel cell. The control system may comprise the device(s) and/or controllers thereof.

The control system may be configured to be retrospectively connected to pre-existing, conventional devices. These may include a pre-existing and conventional TERU and power module. In doing so, pre-existing data links and/or power connections of a TERU and/or power module may be utilised for connecting to the controller.

The controller may comprise an internal battery as a source of power for the controller and/or for the device power connection. Alternatively or additionally the controller may comprise a power connection for supplying power to the controller from the vehicle or from a device of the at least one device(s). In this way, the controller can be powered from an external source/device, such as an external battery of the vehicle or a dedicated external battery for the controller. Alternatively, or in addition, an internal battery of the controller may be charged by such external sources/devices.

The above mentioned sources of power may also provide the power to the controller for powering the at least one device, such as for power transmitted to a TERU in order to power a temperature sensor thereof.

Device data connections may connect the controller to a power module and the vehicle. In this way, signals such as control signals and data can be transmitted between these components in a network.

Data transmitted to and from the controller, vehicle and devices along any data connection may include any telematics data, including but not limited to: the status of any device; the status of the vehicle and/or vehicle engine; a location of the vehicle; a temperature of the TERU; an external temperature; tyre pressure of the vehicle; alarm signals; and/or maintenance signals for any device.

The device power connections mentioned herein may be 0-24 V DC power lines, and/or the power connections may be two-way.

The controller may be connected to the vehicle via a two-way data link, a wake signal line and a power line.

With the plurality of device data connections, a complete data connection network may be formed between any combination of: the controller, the vehicle and any of the other devices mentioned herein. The controller may comprise a device data connection for each of the respective devices. Such networks may be used to relay any control signals and/or data to any component in the network.

Device data connections may connect the controller to a HMI and the HMI may be configured to receive inputs from a user of the system, and/or display outputs such as telematics data or a status of the control system. Such a HMI may be a universal HMI for receiving inputs for a plurality of devices and displaying outputs from a plurality of devices. A universal HMI reduces the complexity and cost of the control system. Additional devices connected to the controller may include additional or alternative HMIs, such as dedicated HMIs for a PTO and/or a TERU. Alternatively, or in addition, a display of the vehicle may be used as a HMI, for example a display in the dash of a vehicle. Furthermore, a remote device such a smartphone or tablet may be used as a HMI.

The inputs to any of the HMIs may include overall settings for the system, including but not limited to: a temperature set point; TERU controls (e.g. compartments on/off); co-drive parameters, TERU parameters, information on the system (e.g. oil temperature, pressure etc.).

The controller may comprise a controller power connection for supplying power to the controller from the vehicle or a device may supply power from a device such as a battery. In this way, no other component is required to power the device (although it will be appreciated power may also be supplied to the device from elsewhere). The battery may be integrated into the controller. The battery may be periodically charged; by using the power connection for supplying power to the communication apparatus from the vehicle or a device and/or the power connection this may performed using a PTO unit when the vehicle is running and/or using conventional features of the vehicle, such as another battery or a fuel cell.

There may be a plurality of such controller power connections for supplying power to the controller form a number of sources.

Any or all of the vehicle data connection, vehicle engine on/off connection, or device data connections may be wired data bus connections, such as CAN data bus, including but not limited to a J1939 vehicle bus. Such data connections are typically more robust, more secure, faster and less prone to radio interference than wireless signals. Alternatively, any or all of the data connections may be wireless connections such as WiFi.

Telematics data, including the device data mentioned above may be transmitted by the control system to an external point. For example, the telematics data may be sent from the controller to a telematics output where it is transmitted to another vehicle and/or external telematics system. A telematics input may also be connected to the controllers for receiving data. In this way, a global communication network can be established between many vehicles, their controllers and devices can be established for the sharing of telematics data; for example, to track the location of all the vehicles in the global network, the temperatures of TERUs, and/or external temperatures in a region etc.

In a second aspect, the present invention provides a vehicle for refrigerated or frozen transport of goods comprising a transport engineless refrigeration unit and any of the control systems for a transport engineless refrigeration unit described above in relation to the first aspect, wherein the plurality of vehicle devices comprises the transport engineless refrigeration unit and the transport engineless refrigeration unit is connected to the controller via one of the plurality of device data connections and the device power connection The vehicle may comprise any of the optional devices described herein. For example, but not limited to: any TERU; any power module any PTO; any HMI; any telematics output/input; any battery; any inverter; and/or any fuel cell. In some example implementations the vehicle comprises the control system with the controller and the associated connections, as well as a power module and a TERU, optionally with features as discussed above.

The vehicle may comprise a PTO that is configured to power the TERU when the vehicle engine is running, for example by supplying power via a power module of the vehicle.

As mentioned above, the controller may be arranged to transmit telematics data to the vehicle using the vehicle data connection. Using data from the vehicle data connection, the vehicle dash may display telematics data for a driver of the vehicle. In this way, the driver can monitor any or all of the data discussed previously.

The vehicle may comprise safety logic separate to the control system.

In response to a start-up request signal from the controller (via the vehicle engine on/off connection) for triggering start-up of the vehicle engine, the safety logic of the vehicle may make a determination of whether or not it is safe to start the vehicle engine. If it is determined that it is safe, the safety logic may send a start signal to the vehicle engine and optionally the vehicle may return a signal to the controller indicating that the engine has been started. If it is determined that it is not safe, the safety logic may send a signal to the controller to indicate this and the vehicle engine will not start.

The determination made by the safety logic of whether or not it is safe to start to vehicle engine may be based on any one or combination of the following parameters: a fuel level of the vehicle; an oil level of the vehicle engine; a temperature of the engine; a location of the vehicle (e.g. a confined space being considered unsafe); a presence of a driver in the vehicle; vehicle temperatures (including but not limited to engine temperatures, coolant temperatures, gearbox temperatures and/or exhaust temperatures); a state of the vehicle gearbox (e.g. in the neutral position to be safe); and/or a speed of the vehicle (e.g. stationary to be safe)/These parameters may be sent to the safety logic via the vehicle or the controller.

The determination may also be used based on parameters from any of the optional devices described herein.

One such device may be a breathalyser that is configured to test a driver's blood alcohol level as an additional parameter.

As mentioned above, advantageously, by having safety logic external to the controller in the vehicle means that the controller is absent any safety logic relating to start-up of the vehicle engine. Thus, the controller may be incapable of determining if it is safe to start up the vehicle engine. Instead, it is left to the vehicle/the engine to apply safety logic and decide if the engine can be started after receiving a request to start the engine (the start-up request signal) via the vehicle engine on/off connection.

This is a difference compared to some prior art systems where the control system for the TERU takes up some responsibility for determining if it is safe to start the vehicle engine, because until the engine is started it is not possible for the control system to perform all its functions. Thus, in the prior art the control system of the TERU may need to periodically insist on a start-up for the vehicle engine to power the TERU and to check the status of the TERU, such as to check that temperature conditions are adequate to avoid spoilage of goods without added refrigeration. In contrast, with the proposed control system since there are both power and data connections it becomes possible for the control system to power the TERU in order to obtain temperature sensor data, thereby allowing the required status check without a compulsory start-up of the vehicle engine. This means that the vehicle engine on/off connection at the control system can instead request a vehicle start-up only on basis that the vehicle itself deems it to be safe to do so, with the safety logic residing on the vehicle (optionally solely on the vehicle). The control system may be arranged such that the vehicle engine is only requested to start-up if vehicle engine power is needed, i.e. for refrigeration or for recharging batteries.

As safety logic is typically specific to the vehicle which the controller is fitted to, this enables the safety logic to be incorporated into the vehicle by the vehicle manufacturer as opposed to being incorporated into the controller by the controller manufacturer (which may be a different entity). As such, the controller can be used with a greater range of vehicles without having to adapt the controller software etc.

The communication system may be retrofit to an existing vehicle in the manner discussed previously.

Telematics data may be sent globally from the vehicle and/or between vehicles, as discussed previously in relation to telematics outputs and inputs. In this way, a global large communication network can be established with minimum modification to existing vehicles.

In a third aspect, the present invention provides a method for monitoring and controlling a temperature of a transport engineless refrigeration unit of a vehicle as described above in relation to the second aspect, the method comprising: powering a temperature sensor of the transport refrigeration unit via the device power connection; monitoring the temperature of the transport engineless refrigeration unit using the temperature sensor; and activating the truck and/or power take off unit in order to power the transport engineless refrigeration unit if the temperature of the transport engineless refrigeration unit is outside of a predetermined range.

It will be appreciated that any of the control systems described above in relation to the first aspect, and any of the vehicles described in relation to the second aspect may be configured to perform any method according to the third aspect. It will also be appreciated that the method may utilise any of the features described in relation to the first and/or second aspect.

By monitoring and controlling a temperature of the transport refrigeration unit it may be meant that a temperature controlled compartment of the TERU is kept with a certain range of temperature by periodic cooling via refrigeration.

Activating the truck and/or power take off unit may comprise starting the vehicle engine.

The method may also comprise stopping the powering of the transport engineless refrigeration unit when the temperature is within a second predetermined ranged and continuing to monitor the temperature of the transport engineless refrigeration unit using the temperature sensor. In this way the method can be repeated periodically, whenever the temperature of the TERU is unacceptable.

The second predetermined range may be the same as the first predetermined range or different.

For refrigerated cargo, the first and/or second predetermined range may be greater than 10° C., greater than 8° C., greater than 6° C. or greater than 4° C.

For frozen cargo, the first and/or second predetermined range may be greater than −22° C., greater than −20° C., greater than −18° C. or greater than −16° C.

The method may comprise sending a wake signal from the controller to the vehicle if the temperature of the transport engineless refrigeration unit is outside of a predetermined range.

The method may comprise a step of determining if it is safe to activate the truck and/or power take off unit based on safety logic. The vehicle may comprise the safety logic and safety logic may be separate to the control system.

The method may comprise triggering a start-up of the vehicle engine via the engine on/off connection is and it may also comprise providing a start-up request to the vehicle engine, whereafter safety logic at the vehicle may determine if the engine should be started, as discussed previously.

The start-up request may be se sent to the vehicle engine via a high/low state for a voltage on a suitable line The method may comprise applying safety logic in the vehicle/the engine in order to determine if the engine can be started after receiving a request to start the engine via the vehicle engine on/off connection.

The method may therefore comprise requesting a vehicle start-up only on a basis that the vehicle itself deems it to be safe to do so, with the safety logic residing on the vehicle (optionally solely on the vehicle).

The method may comprise only requesting a vehicle start-up if vehicle engine power is needed, e.g. for refrigeration or for recharging batteries.

The method may comprise making a determination by safety logic of the vehicle of whether or not it is safe to start to vehicle engine may be based on any one or combination of the following parameters: a fuel level of the vehicle; an oil level of the vehicle engine; a temperature of the engine; a location of the vehicle (e.g. a confined space being considered unsafe); a presence of a driver in the vehicle; vehicle temperatures (including but not limited to engine temperatures, coolant temperatures, gearbox temperatures and/or exhaust temperatures); a state of the vehicle gearbox (e.g. in the neutral position to be safe); and/or a speed of the vehicle (e.g. stationary to be safe).

The method may comprise sending any of the above parameters to the safety logic via the vehicle or controller and the determination may also be used based on parameters from any of the optional devices described herein.

The method may comprise controlling and at least partially powering a TERU without a need to power intermediate or additional components such as a PTO unit with the engine of the vehicle.

The TERU may comprise a temperature sensor, and the method may comprise powering and controlling the temperature sensor via the connections described above and so a temperature of the TERU (for example a temperature of a cargo compartment) can be monitored without activating any intermediate components, such as a PTO and/or vehicle engine.

The method may comprise controlling a power module and transmitting data and/or between the power module and the controller.

The method may comprise supplying power to the power module from a power take off unit (PTO) of the vehicle, and supplying power to a refrigeration system of the transport engineless refrigeration unit via the power module The method may comprise the controlling/powering of any of the optional devices described herein.

The method may comprise retrospectively connecting the control system to pre-existing, conventional devices.

The method may comprise supplying power to the controller from an external source/device, such as an external battery of the vehicle or a dedicated external battery for the controller. Alternatively, or in addition, the method may comprise supplying power to an internal battery of the controller may be charged by such external sources/devices.

The method may comprise periodically charging a battery of the controller; by using a power connection for supplying power to the communication apparatus from the vehicle or a device and/or the power connection this may performed using a PTO unit when the vehicle is running and/or using conventional features of the vehicle, such as another battery or a fuel cell.

The method may comprise supplying power from the above mentioned sources of power to the controller for powering at least one device, such as for power transmitted to a TERU in order to power a temperature sensor thereof.

The method may comprise transmitting data and/or control signal in a network between any of the devices and controller described herein.

The method may comprise receiving inputs and/or displaying outputs with any of the HMIs described herein.

The method may comprise transmitting and or receiving any of the telematics data described herein.

BRIEF DESCRIPTION OF THE DRAWINGS

Certain example embodiments will now be described by way of example only and with reference to the accompanying drawings, in which.

DETAILED DESCRIPTION OF THE INVENTION

Figure 1:
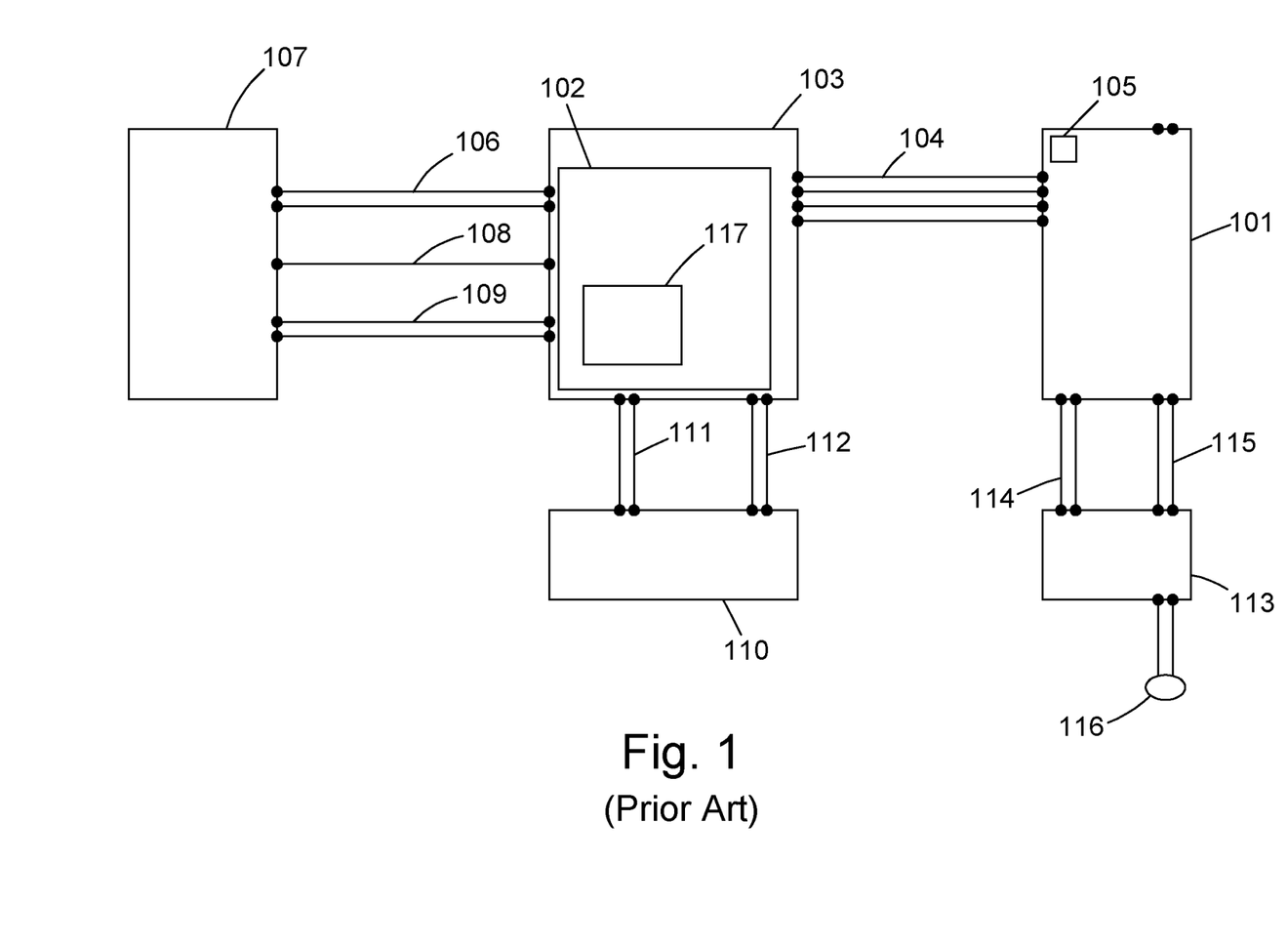
FIG. 1 shows a schematic view of a conventional control system for a transport engineless refrigeration unit.

A conventional control system 100 for a TERU 101 is shown in FIG. 1. The control system 100 comprises a controller 102 integrated within a power module 103 that is connected to power take off unit (PTO). Power is supplied to the power module 103 via a PTO which is powered by the combustion engine (not shown) of a vehicle 107. The power module 103 comprises a hydraulic pump and system (not shown) and a generator (not shown) that is powered by the hydraulic system to deliver substantially constant 400V/3/50 Hz power via power connection 104 to the TERU 101 in order to power the refrigeration system (not shown) of the TERU and a temperature sensor 105 of the TERU. It will be appreciated that in this system, in order to monitor the temperature of the TERU and carry out refrigeration, the vehicle engine must be running to provide the necessary power.

There is a two-way data link 106, a 24V wake signal line 108 and a 24V DC power connection 109 between the vehicle 107 and the controller 102.

The controller 102 comprises safety logic 117 for determining whether or not it is safe to start the vehicle engine at any one time.

The control system 100 also comprises a human machine interface 110. The human machine interface (HMI) 110 is connected to the controller via a 24V DC power line 111 and a two-way data connection 112. It will be appreciated that it in this system, in order to power the human machine interface, the vehicle engine must be running in order to power the power module 103 (which subsequently powers the TERU and HMI).

With the two way data connection 111, user can enter inputs for the controller 102 and the power module 103 at the human machine interface, and view data sent to the HMI from the controller and/or power module.

The control system 100 also comprises a second human machine interface 113 for the TERU 101. The second human machine interface 113 is connected to the TERU via a 24V DC power line 114 and a two way data connection 115. It should be noted that there is no direct data connection between the TERU (or the sensor of the TERU) and the controller 102 (or the power module) and so no direct communication between the TERU and controller is possible. Instead, data (such as temperature data from temperature sensor 105 of the TERU 101) is sent through the two way data connection 115 to the second human machine interface 113 and from the second human machine interface 113 to a telematics output 116. From the telematics output 116 data can be transmitted elsewhere (e.g. to an external telematics system) and eventually relayed back to the controller 102, user and/or vehicle 107. As such, there is no data connection between the controller and the TERU at the control system (hardware) level.

Furthermore, the controller 102, TERU 101, human machine interfaces 110, 113 and telematics output 116 are all reliant on the power module 103 for power and so the vehicle engine must be running for the control system to operate.

Figure 2:
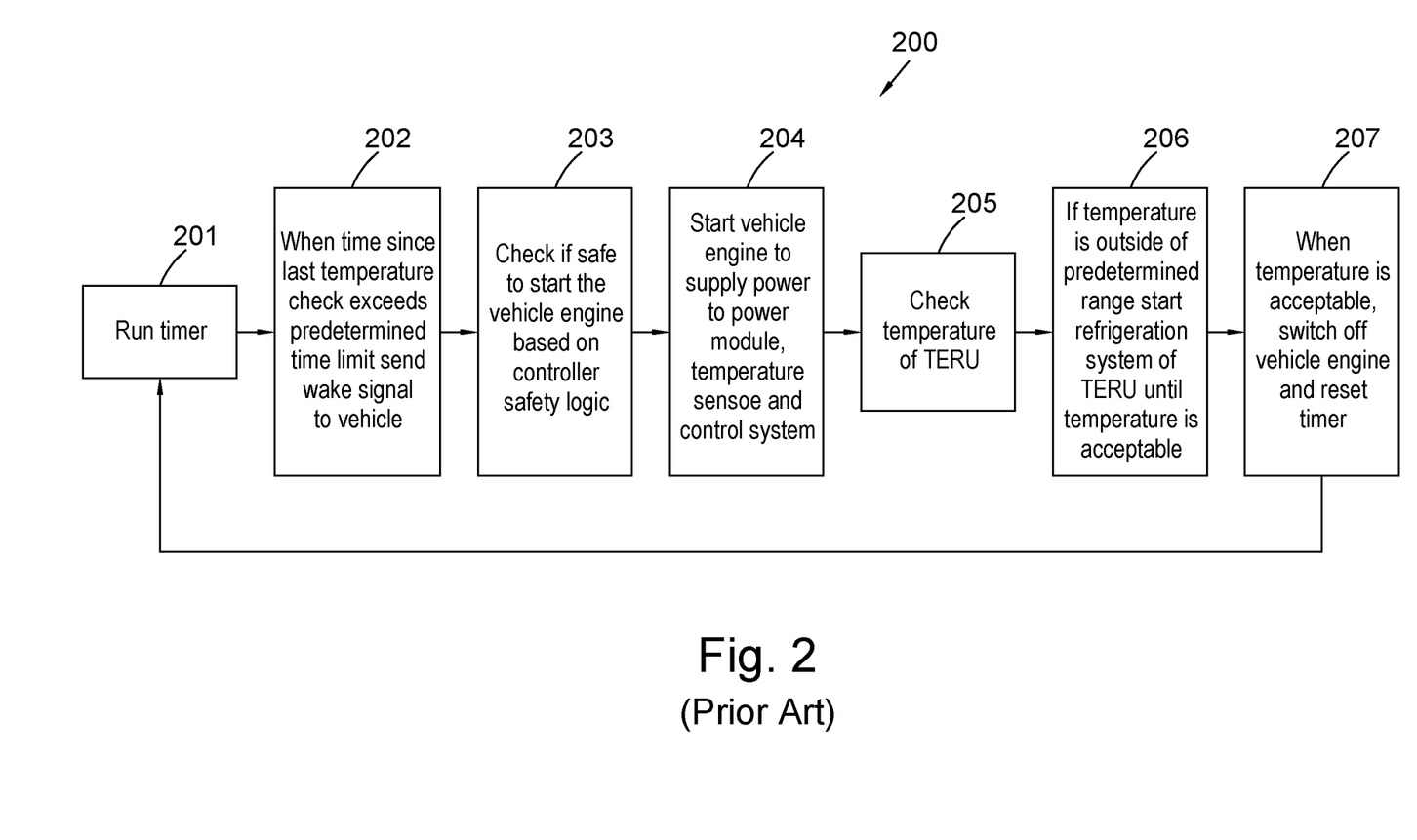
FIG. 2 shows a flow chart of a conventional method for monitoring and controlling a temperature of a transport engineless refrigeration unit using the conventional control system shown in FIG. 1.

The above described control system can be utilised to carry out a method of monitoring and controlling a temperature of the TERU as shown in FIG. 2, in particular whilst the vehicle engine is turned off (and the vehicle is stationary, e.g. parked overnight). In doing so, the method described below in relation to FIG. 2 is carried out periodically at intervals as described below.

With reference to the method of monitoring and controlling a temperature of the TERU shown in FIG. 2, at step 201 of the method, the timer of the controller measures the amount of time that has passed since it was last reset. Once this time exceeds a predetermined time limit (e.g. 30 minutes) the method proceeds to step 202, where a wake signal is sent to the vehicle 107 from the controller via the wake signal line 108. This establishes communication between the vehicle 107 and the controller 102 via the two-way data link 106.

At step 203 the controller determines whether or not it is safe to start the vehicle engine based on safety logic 117 within the controller. This determination may be made based on any of the parameters previously discussed. If it is determined that it is safe to start the vehicle engine, the method proceeds to step 204 and the vehicle engine is started via a command signal that is sent from the controller to the vehicle via the data link 116. The engine then powers the PTO, which in turn powers the power module 103, subsequently generating transmitting power to the TERU 101, its temperature sensor 105, the telematics output 116, the controller 102 and the first and second human machine interfaces 110, 113 in the manner described above.

The method then proceeds to step 205, where the temperature of the TERU is measured using the temperature sensor 105, and this measurement is sent via two way data connection 115 to the second human machine interface and then to telematics output 116 to be relayed back to the controller 102.

At step 206, if the measured temperature of the TERU is outside of a predetermined range (e.g. if it is greater than 8° C. for refrigerated goods or greater than −18° C. for frozen goods) then the refrigeration system of the TERU is started, powered by the power module 103, in order to lower the temperature.

Once the measured temperature is acceptable, the vehicle engine is switched off via another control signal sent from the controller 102 to vehicle 107 via the data link 106 and the timer of the controller is reset, thus restarting the method 200 at step 201.

One problem with this system is that the engine must be switched on before various components of the control system can be powered and the method shown in FIG. 2 can be performed.

Figure 3:
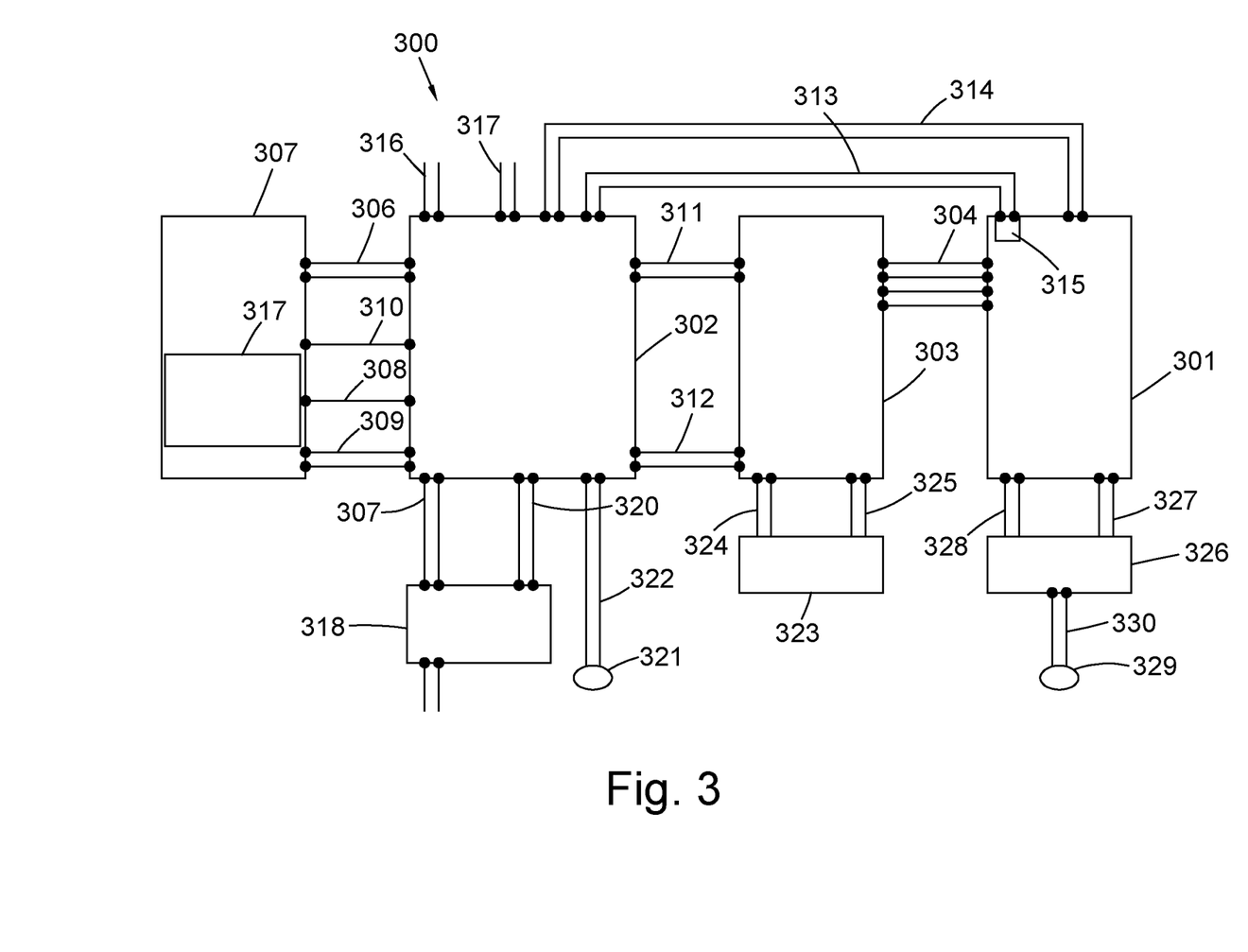
FIG. 3 shows a schematic view of a proposed control system for a transport engineless refrigeration unit with a data connection for the transport engineless refrigeration unit.

FIG. 3 is a schematic view of a proposed control system 30 for a transport engineless refrigeration unit 301 with additional functionality compared to that of FIG. 1. Similar to the system shown in FIG. 1, the control system of FIG. 3 comprises a controller 302. However, the controller 302 is separate to a power module 303.

Similar to the system shown in FIG. 1, the power module 303 is powered by a PTO coupled to a combustion engine (not shown) of a vehicle 107 and comprises a hydraulic pump and hydraulic system (also not shown) and a generator (also not shown) that is powered by the hydraulic system to deliver substantially constant 400V/3/50 Hz power via power connection 304 to the TERU 301 in order to power the refrigeration system (not shown) of the TERU.

Similar to the system shown in FIG. 2, the controller 302 is connected to the vehicle 307 via a two-way data connection 306, a 24V wake signal line 308 and a 24V DC power connection 309 between the vehicle 307 and the controller 302. However, there is also a 24V engine on/off signal line 310 between the vehicle and the controller 302. In this particular arrangement, the 24V engine on/off signal line 310 acts as an additional wake signal line. The method of monitoring and controlling a temperature of the TERU shown in FIG. 4 and described in more detail below will explain the function of these various connections.

In contrast to the system shown in FIG. 2, the vehicle comprises safety logic 317 for determining whether or not it is safe to start the vehicle engine at any one time.

The controller is also connected to the power module 303 via a two-way data link 311 and 24V DC power line 312. The power line serves to charge a battery of the controller (not shown) when the vehicle engine is on and the power module 303 is transmitting power.

Fundamentally, the controller 302 is also connected to the TERU 301 via 24V Dc power line 313 and two-way data connection 314. This mean the controller can supply some power to the TERU directly, for example to power a temperature sensor 315 that monitors the temperature of a chilled compartment in the TERU 301. Furthermore, the measured temperature can be sent from the temperature sensor 3115 directly to the controller 302 via the two-way data link 314. In this way, as described in more detail below with reference to the method shown in FIG. 4, the temperature of the TERU can be monitored without having to start the vehicle engine, power module 303 and PTO unnecessarily.

The controller 302 also has additional two-way data connections 316 for communicating with other vehicle devices and additional power lines 317 for powering, and/or receiving power from additional vehicle devices. These additional vehicle devices could include a battery pack, and inverter, a fuel cell, lights, or any manner of vehicle sensors such as temperature sensors, intruder alarms or maintenance alarms.

The controller is also connected to an optional universal HMI 318 via a two-way data connection 319 and a 24V DC power line 320. Due to the data connections 319, 314, 306, 311 discussed above, the universal HMI may be used to input controls for the controller 302, power module 303, PTO, TERU 301 and vehicle 307 a two-way data links form connections between all of these components at the control system level to form a communication network.

The controller is also connected to an optional telematics output 321 via a two-way data link 322. The telematics output 321 transmits telematics data to, and receive data from, elsewhere such as an external telematics system or another vehicle.

There are also two other optional HMIs in the control system 300 shown in FIG. 3: a power module HMI 323 which is connected to the power module 303 via a two-way data link 325 and a power line 324, and a TERU HMI 326 which is connected to the TERU 301 via a two-way data link 327 and a power line 328. These two additional (optional) HMIs can be used for any of the outputs/inputs discussed above.

The TERU HMI 326 is also connected to a second optional telematics output 329 via a two-way data link 330. The telematics output 330 can transmit/receive and of the telematics data described above.

The above described control system can be utilised to carry out a method 400 of monitoring and controlling a temperature of the TERU as shown in FIG. 3, in particular whilst the vehicle engine is turned off (and the vehicle is stationary, e.g. parked overnight).

Figure 4:
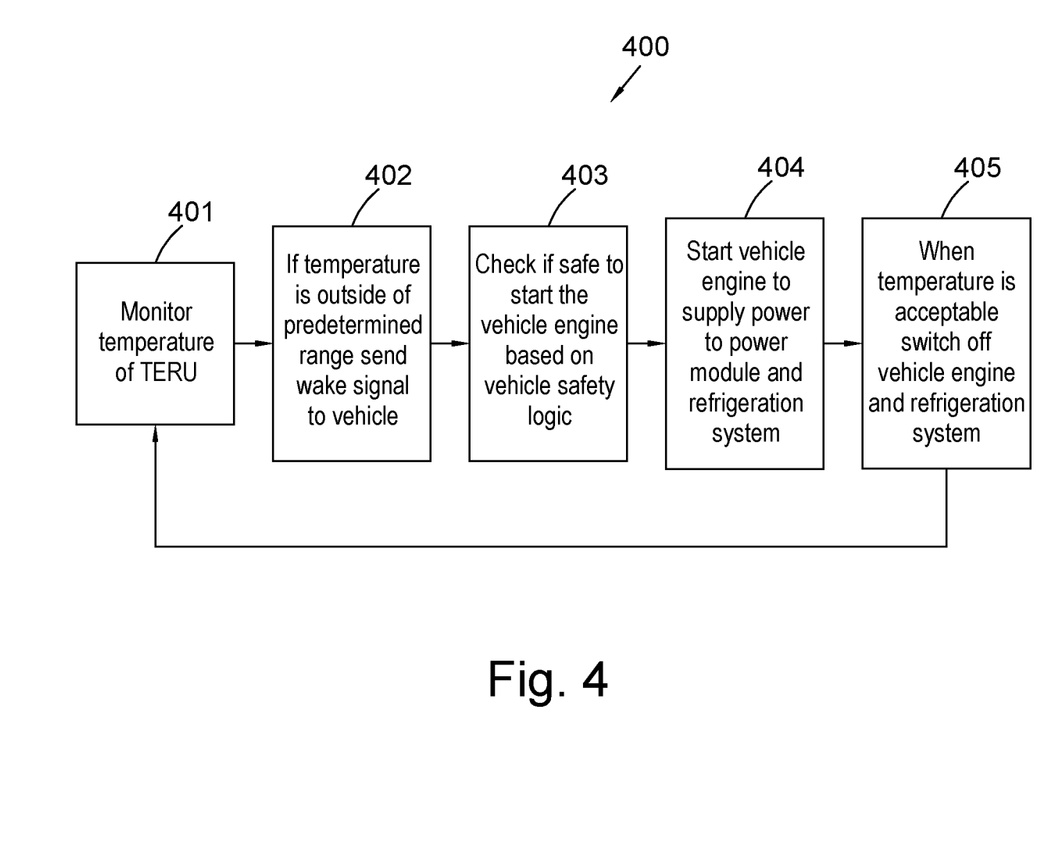
FIG. 4 shows a flow chart of a method for monitoring and controlling a temperature of a transport engineless refrigeration unit using a control system as in FIG. 3.

The method 400 begins at step 401, where the temperature of the refrigerated compartment of the TERU is monitored by the temperature sensor 315. Because the temperature sensors 315 is connected to the controller via the power line 313 and two-way data connection 314, temperature measurements can be sent to the controllers without having to start the vehicle engine, power module 303, or the PTO. The power supplied to the temperature sensor from the controller may come from an internal battery of the controller, or another device, such as an external battery.

In this way, the temperature of the refrigerated compartment of the TERU can be monitored continuously and there is no need for a timer.

If the measured temperature is outside of a predetermined range (e.g. if it is greater than 8° C. for refrigerated goods or greater than −18° C. for frozen goods), the method proceeds to step 402 where a wake signal is sent to the vehicle 307 from the controller 302 via the wake signal line 308. This establishes communication between the vehicle 307 and the controller 302 via the two-way data link 306.

At step 403, the vehicle 307 then determines whether or not it is safe to start the vehicle engine based on safety logic 317 within the vehicle. If it is determined that it is safe to start the vehicle engine, the method proceeds to step 404 and the vehicle engine is started. A signal is sent from the vehicle 307 to the controller via the on/off signal line 310 indicating whether or not the vehicle engine is on. The engine then powers the power module 303 via the PTO, which subsequently transmits power to the refrigeration system of the TERU in order to cool the refrigerated compartment of the TERU.

The temperature of the refrigerated compartment of the TERU is continuously monitored by the temperature sensor 315 during this process and when the controller determines that the temperature is acceptable, for example when the temperature is within a second predetermined range (e.g. less than 6° C. for refrigerated goods or less than −20° C. for frozen goods) the vehicle engine is switched off and the system returns to a state in which the temperature of the refrigerated compartment of the TERU is monitored, but the engine, PTO and power module 303 are turned off (i.e. the sleep mode). In this way, the method then repeats again at step 401 with continuous monitoring of temperature.

This method reduces energy consumption of the vehicle as it enables a sleep mode of the TERU in which the temperature can still be monitored.

What is claimed is:

1. A control system for a transport engineless refrigeration unit (TERU), the control system comprising:
   a controller for communication between a vehicle and a plurality of vehicle devices, the controller comprising:
   a vehicle data connection for transmitting data to and from a vehicle;
   a vehicle engine on/off connection for triggering start-up of a vehicle engine;
   a plurality of device data connections, wherein each device data connection transmits data to and from at least one vehicle device; and
   a device power connection, wherein the device power connection supplies power from the controller to at least one vehicle device;
   wherein the controller is configured to trigger the start-up of the vehicle engine based on a determination by safety logic external to the controller that it is safe to start the engine, wherein the controller hence does not include the safety logic; and
   wherein the control system is configured to be retrospectively connected to a pre-existing, conventional TERU and/or any of the vehicle devices.

2. The control system of claim 1, wherein the at least one vehicle device to which the device power connection supplies power, and which a device data connection of the plurality of device data connections transmits data to and from includes the TERU, wherein the TERU comprises a temperature sensor.

3. The control system of claim 1, wherein the controller comprises a plurality of device data connections, and each device data connection is configured to be connected to at least one vehicle device, wherein each vehicle device comprises any one of: a TERU; a PTO; a HMI; a telematics output and/or input; a battery; an inverter; a generative axle; a solar panel; a fuel tank gauge; additional temperature sensors; and/or a fuel cell.

4. The control system of claim 1, wherein the device data connections, the vehicle data connection, and/or the vehicle engine on/off connection are two-way data connections, such that the device data connections, the vehicle data connection, and/or the vehicle engine on/off connection form a communication network between any vehicle devices.

5. The control system of claim 1, wherein the device data connections, the vehicle data connection and/or the vehicle engine on/off connection are wired connections.

6. The control system of claim 1, wherein power is supplied to the controller from an internal battery, and/or wherein the controller comprises a controller power connection for receiving power from the vehicle or from at least one vehicle device.

7. The control system of claim 1, wherein at least one vehicle device to which a device data connection transmits data to and from is a human machine interface (HMI), and wherein the controller is configured such that inputs and controls for the system can be received from the HMI and telematics outputs can be sent to the HMI.

8. The control system of claim 1, wherein at least one vehicle device to which a device data connection transmits data to and from is a telematics input and/or output configured to transmit/receive data to a location outside of the system.

9. A vehicle for refrigerated or frozen transport of goods comprising a transport engineless refrigeration unit and the control system for a transport engineless refrigeration unit as claimed in claim 1, wherein the plurality of vehicle devices comprises the transport engineless refrigeration unit and the transport engineless refrigeration unit is connected to the controller via at least one of the plurality of device data connections and the device power connection.

10. A vehicle as claimed in claim 9, comprising a power take module that supplies power to a refrigeration system of the transport engineless refrigeration unit, wherein the power module is coupled to a power take off unit of the vehicle for the generation of power.

11. A method for monitoring and controlling a temperature of a transport engineless refrigeration unit of a vehicle as claimed in claim 10, the method comprising:
   powering a temperature sensor of the transport refrigeration unit via the device power connection;
   monitoring the temperature of the transport engineless refrigeration unit using the temperature sensor; and
   activating the vehicle and/or power module in order to power the transport engineless refrigeration unit if the temperature of the transport engineless refrigeration unit is outside of a predetermined range.

12. The method of claim 11, comprising:
   stopping the powering of the transport engineless refrigeration unit when the temperature is within a second predetermined ranged and
   subsequently continuing to monitor the temperature of the transport engineless refrigeration unit using the temperature sensor.

13. The method of claim 11, wherein the step of activating the vehicle and/or power module comprises providing a start-up request to the vehicle engine from the controller; determining if it is safe to activate the vehicle and/or power module based on safety logic; and starting the vehicle engine and the method further comprises a step of wherein the vehicle preferably comprises the safety logic and the safety logic is separate to the control system.

* * * * *